Figure 1:
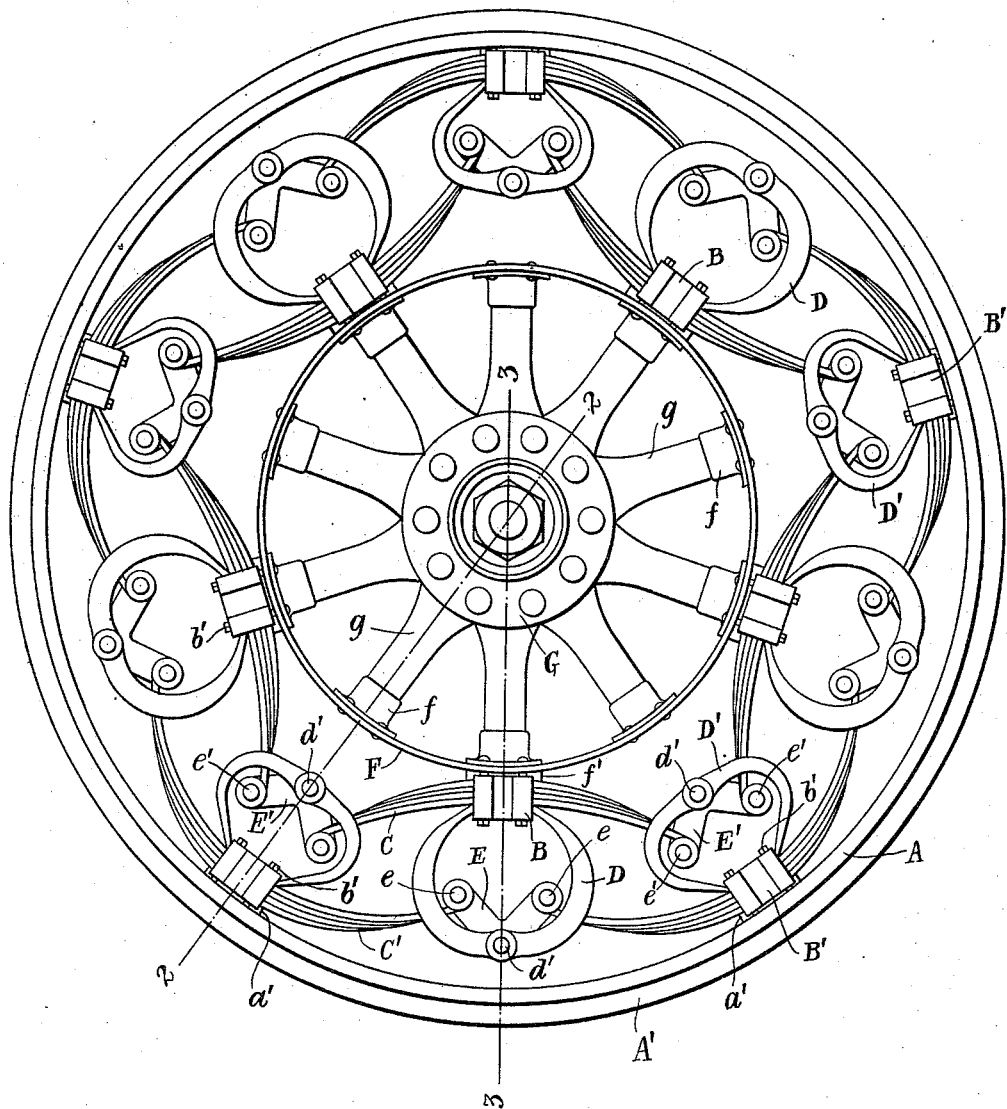

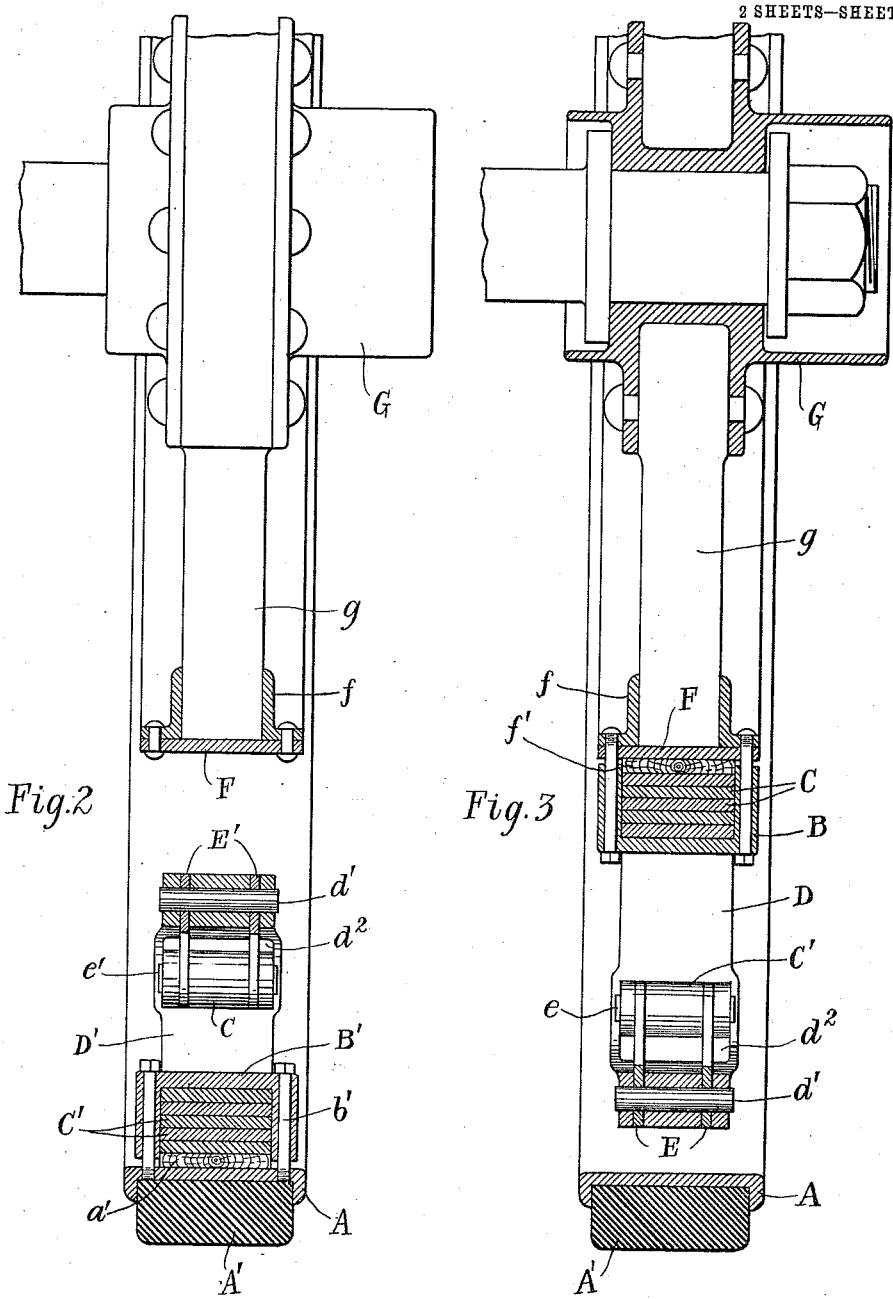

UNITED STATES PATENT OFFICE.

FRANK ZIMMERMANN, OF NEW YORK, N. Y., ASSIGNOR TO FRANCIS KEIL & SON, OF NEW YORK, N. Y.

RESILIENT TIRE.

1,018,735.  Specification of Letters Patent.  Patented Feb. 27, 1912.

Application filed May 12, 1911. Serial No. 626,746.

*To all whom it may concern:*

Be it known that I, FRANK ZIMMERMANN, a subject of Germany, and a resident of New York, in the county and State of New York, have invented a certain new and useful Resilient Tire, of which the following is a specification, the same being a full, clear, and exact description of the invention, such as will enable others skilled in the art to which it appertains to make and use the same.

This invention relates to a continuous band or supporting device placed around a wheel to form a tread, and in particular to a resilient tire adapted for use with vehicles of various descriptions, and particularly in connection with automobiles, etc., which invention embodies certain novel features of construction and combination and arrangement of parts, all of which will be hereinafter set forth.

This invention has for its object the provision of a tire for vehicles comparatively simple in construction, inexpensive to manufacture, and which operates with the required camber or resilience and which is also efficient in practical use.

The accompanying drawings illustrate a device made according to my invention, in which like letters of reference refer to like parts throughout the several views, referring to which—

Figure 1 is an elevation of my tire; Fig. 2 is a view in section taken on the line 2, 2, Fig. 1; and Fig. 3 is a similar sectional view taken on the line 3, 3, of Fig. 1.

Referring particularly by reference characters or symbols to the drawings, A denotes a tire preferably made of metal, to which may be attached the tread A′, ordinarily made of rubber. To the spokes $g$ of a hub G, which may be of any ordinary or suitable construction and description, I attach, as by sockets $f$, a preferably metallic band F, to which band F are attached a plurality of U-shaped brackets B constructed and arranged to hold within the same in the present instance or embodiment of my invention the central portions of elliptic springs C comprising a series of plates adapted to act cumulatively in accordance with the strain upon the same caused by the load or shock.

The end of the springs C are supported by levers E carried by ring brackets D′ and pivoted to the same by bolts $d'$. The springs C extend within the brackets D′ through openings or slots $d^2$ formed in the sides of the latter. The brackets D′ are held to the tire A by the U-shaped brackets B′ which are secured to the said tire.

The brackets B′ also serve to hold the central portions of springs C′ which are formed in a similar manner as are the springs C, the ends of which springs C′ extend within the ring brackets D through slots or openings $d^2$ and are attached to levers E which are pivoted to the said brackets at $d'$. The brackets D are supported by being held between the brackets B and the central portions of the springs C.

It will thus be seen that the springs C, C′ are alternately disposed or positioned in staggered order or in echelon, and that the strain or load upon any one spring will be distributed not only upon the two springs at the sides of the same, but also upon the two springs, the ends of which lie opposite the said spring.

It will be observed that my tire has great elasticity, and also has great strength as the superimposed additional or supplemental spring plates of the springs C and C′ are brought into play or use in proportion as the load or strain is increased, and the vehicle equipped with my tire will be comfortable for riding in, as any shock is distributed to such a distance on each side of the concussion that the same will be in a great measure absorbed.

I wish it to be understood that I do not desire to be limited to the exact details of construction shown and described, for obvious modifications will occur to persons skilled in the art.

What I claim as my invention is:

1. In a resilient tire, a plurality of springs respectively alternately held at their central portions to the hub and tire, and disposed or positioned in staggered order, means attached to the tire to support the ends of adjacent springs which are secured to the hub, and means attached to the hub to support the ends of adjacent springs which are secured to the tire; the parts being so positioned that each spring attached to the hub is connected not only with the ends of two springs respectively attached to the hub at the sides of the same, but also with the ends of two springs attached to the tire at the sides of the same, the said ends of which lie opposite the first named spring, in order that the strain or load upon any one spring is distributed positively, but differentially, upon four other springs, primarily upon two springs located opposite the same and secondarily upon two springs respectively positioned at each side thereof.

2. In a resilient tire, a plurality of springs respectively alternately held at their central portions to the hub and tire, and disposed or positioned in staggered order, means attached to the tire to support in a rocking relation the ends of adjacent springs which are secured to the hub, and means attached to the hub to support in a rocking relation the ends of adjacent springs which are secured to the tire; the parts being so positioned that each spring attached to the hub is connected not only with the ends of two springs respectively attached to the hub at the sides of the same, but also with the ends of two springs attached to the tire at the sides of the same, the said ends of which lie opposite the first named spring.

3. In a resilient tire, a plurality of springs respectively alternately held at their central portions to the hub and tire, and disposed or positioned in staggered order, means attached to the tire to support the ends of adjacent springs which are secured to the hub and the central portions of the springs held to the tire, and means attached to the hub to support the ends of adjacent springs which are secured to the tire and the central portions of the springs held to the hub; the parts being so positioned that each spring attached to the hub is connected not only with the ends of two springs respectively attached to the hub at the sides of the same, but also with the ends of two springs attached to the tire at the sides of the same, the said ends of which lie opposite the first named spring.

4. In a resilient tire a plurality of springs, means whereby the springs at the central portions thereof are alternately attached to the hub and tire, and the adjacent ends of each pair of springs are connected and supported between the hub and tire opposite the said central attachment of the springs, the parts being so positioned that each spring attached to the hub is connected not only with the ends of two springs respectively attached to the hub at the sides of the same, but also with the ends of two springs attached to the tire at the sides of the same, and each spring attached to the tire is attached to the other springs in a similar but reversed manner.

5. In combination, a hub, a plurality of springs attached to the same, a plurality of brackets also carried by the same, a tire, a plurality of brackets attached to the latter, a plurality of springs supported exterior of the first named brackets at their central portions and supported at the ends thereof within the last named brackets, and another series of springs supported exterior of the last named brackets at their central portions, and also supported at the ends thereof within the first named brackets.

In testimony of the foregoing specification I do hereby sign the same in the city of New York, county and State of New York, this 20th day of April, 1911.

FRANK ZIMMERMANN.

Witnesses:
F. A. WURZBACH,
HENRY K. DAVIS.

---

Copies of this patent may be obtained for five cents each, by addressing the "Commissioner of Patents, Washington, D. C."